United States Patent
Kubo

(10) Patent No.: US 10,379,328 B2
(45) Date of Patent: Aug. 13, 2019

(54) CONFOCAL SCANNER, CONFOCAL MICROSCOPE, AND ILLUMINATION METHOD

(71) Applicant: OLYMPUS CORPORATION, Hachioji-shi, Tokyo (JP)

(72) Inventor: Hirokazu Kubo, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/352,734

(22) Filed: Nov. 16, 2016

(65) Prior Publication Data

US 2017/0153433 A1    Jun. 1, 2017

(30) Foreign Application Priority Data

Dec. 1, 2015  (JP) .................................. 2015-235212

(51) Int. Cl.
| | | |
|---|---|---|
| *G02B 21/00* | (2006.01) | |
| *G02B 27/00* | (2006.01) | |
| *G02B 27/48* | (2006.01) | |

(52) U.S. Cl.
CPC ....... *G02B 21/0044* (2013.01); *G02B 21/006* (2013.01); *G02B 21/0032* (2013.01); *G02B 27/0068* (2013.01); *G02B 27/48* (2013.01)

(58) Field of Classification Search
None
See application file for complete search history.

(56) References Cited

U.S. PATENT DOCUMENTS

| | | | |
|---|---|---|---|
| 7,703,922 B2* | 4/2010 | Van de Velde | A61B 3/1025 351/221 |
| 8,275,226 B2 | 9/2012 | Berman | |
| 8,670,178 B2 | 3/2014 | Cooper | |
| 2007/0096014 A1* | 5/2007 | Mikuriya | G02B 21/0044 250/216 |
| 2009/0002789 A1* | 1/2009 | Lauer | G01B 11/2441 359/22 |
| 2010/0142041 A1 | 6/2010 | Berman | |
| 2014/0133017 A1* | 5/2014 | Cooper | G02B 21/0032 359/385 |
| 2015/0029819 A1* | 1/2015 | Yacoubian | G01N 21/171 367/7 |

FOREIGN PATENT DOCUMENTS

| | | |
|---|---|---|
| JP | 2003233010 A | 8/2003 |
| JP | 2007121590 A | 5/2007 |
| JP | 2010162583 A | 7/2010 |

OTHER PUBLICATIONS

Japanese Office Action (and English language translation thereof) dated Jun. 18, 2019 issued in counterpart Japanese Application No. 2015-235212.

* cited by examiner

*Primary Examiner* — Jennifer D. Carruth
(74) *Attorney, Agent, or Firm* — Holtz, Holtz & Volek PC

(57) ABSTRACT

A confocal scanner into which light from a light source is introduced via a multimode optical fiber includes: a disk unit that includes a rotary disk; and an optical system that irradiates the rotary disk with light from an emission end face of the optical fiber. The optical system includes an element that changes a size in which the emission end face of the optical fiber is projected onto the rotary disk.

14 Claims, 15 Drawing Sheets

CONFOCAL SCANNER, CONFOCAL MICROSCOPE, AND ILLUMINATION METHOD

CROSS REFERENCE TO TED APPLICATIONS

This application is based upon and claims the benefit of priority from the prior Japanese Patent Application No. 2015-235212, filed Dec. 1, 2015, the entire contents of which are incorporated herein by this reference.

BACKGROUND OF THE INVENTION

Field of the Invention

The present invention relates to a technology relating to a confocal scanner, a confocal microscope, and an illumination method.

Description of the Related Art

Conventionally, a spinning-disk confocal microscope is known as an apparatus for implementing multifocal confocal microscopy (see U.S. Patent Application Publication No. 2014/0133017). The spinning-disk confocal microscope is generally configured to uniformly illuminate the surface of a spinning disk with a laser beam that has been introduced into a microscope body via an optical fiber. This is because a higher uniformity of illumination on the surface of the spinning disk results in a higher uniformity of multipoint illumination on an object plane and an illumination area on the object plane can be illuminated with a uniform intensity.

SUMMARY OF THE INVENTION

In an aspect of the present invention, a confocal scanner into which light from a light source is introduced via a multimode optical fiber is provided. The confocal scanner includes: a disk unit that includes a rotary disk; and an optical system that irradiates the rotary disk with light from an emission end face of the optical fiber. The optical system includes at least one moving lens that moves in a direction of an optical axis of the optical system.

In another aspect of the present invention, a confocal microscope is provided that includes: a light source; the confocal scanner in the aspect above; a multimode optical fiber that introduces light from the light source into the confocal scanner; and a controller that controls the movement of the at least one moving lens.

In another aspect of the present invention, a confocal microscope is provided that includes: a laser that is a light source; the confocal scanner in the aspect above; and a speckle reducer that periodically operates at a frequency that is greater than or equal to a frame rate at which the confocal microscope obtains an image.

In yet another aspect of the present invention, a confocal scanner into which light from a light source is introduced via a multimode optical fiber is provided. The confocal scanner includes: a disk unit that includes a rotary disk; and an optical system that irradiates the rotary disk with light from an emission end face of the optical fiber. The optical system includes a spatial light modulator that is arranged in an optical path between the emission end face of the optical fiber and the rotary disk.

In yet another aspect of the present invention, a confocal microscope is provided that includes: a light source; the confocal scanner in the aspect above; a multimode optical fiber that introduces light from the light source into the confocal scanner; and a controller that controls the spatial light modulator.

In yet another aspect of the present invention, a confocal scanner into which light from a light source is introduced via a multimode optical fiber is provided. The confocal scanner includes: a disk unit that includes a rotary disk; and an optical system that irradiates the rotary disk with light from an emission end face of the optical fiber. The optical system includes an element that changes a magnification at which the emission end face of the optical fiber is projected onto the rotary disk.

BRIEF DESCRIPTION OF THE DRAWINGS

The present invention will be more apparent from the following detailed description when the accompanying drawings are referenced.

FIG. 6 illustrates another example of an emission end face of an optical fiber 103a.

DESCRIPTION OF THE EMBODIMENTS

A field of view of a microscope such as a spinning-disk confocal microscope varies according to a total magnification. Accordingly, a size relationship between an illumination area and the field of view also varies according to the total magnification. In a case in which the illumination area is smaller than the field of view, even when the inside of the illumination area is uniformly illuminated, a non-illumination area exists in the field of view. Therefore, uniformity of illumination deteriorates. In a case in which the field of view is smaller than the illumination area, an area outside the field of view is also illuminated. Therefore, an illumination efficiency deteriorates. Note that the illumination efficiency refers to a ratio of light illuminating the inside of the field of view to light emitted from a light source.

Examples of the present invention are described below with reference to the drawings.

Figure 1:
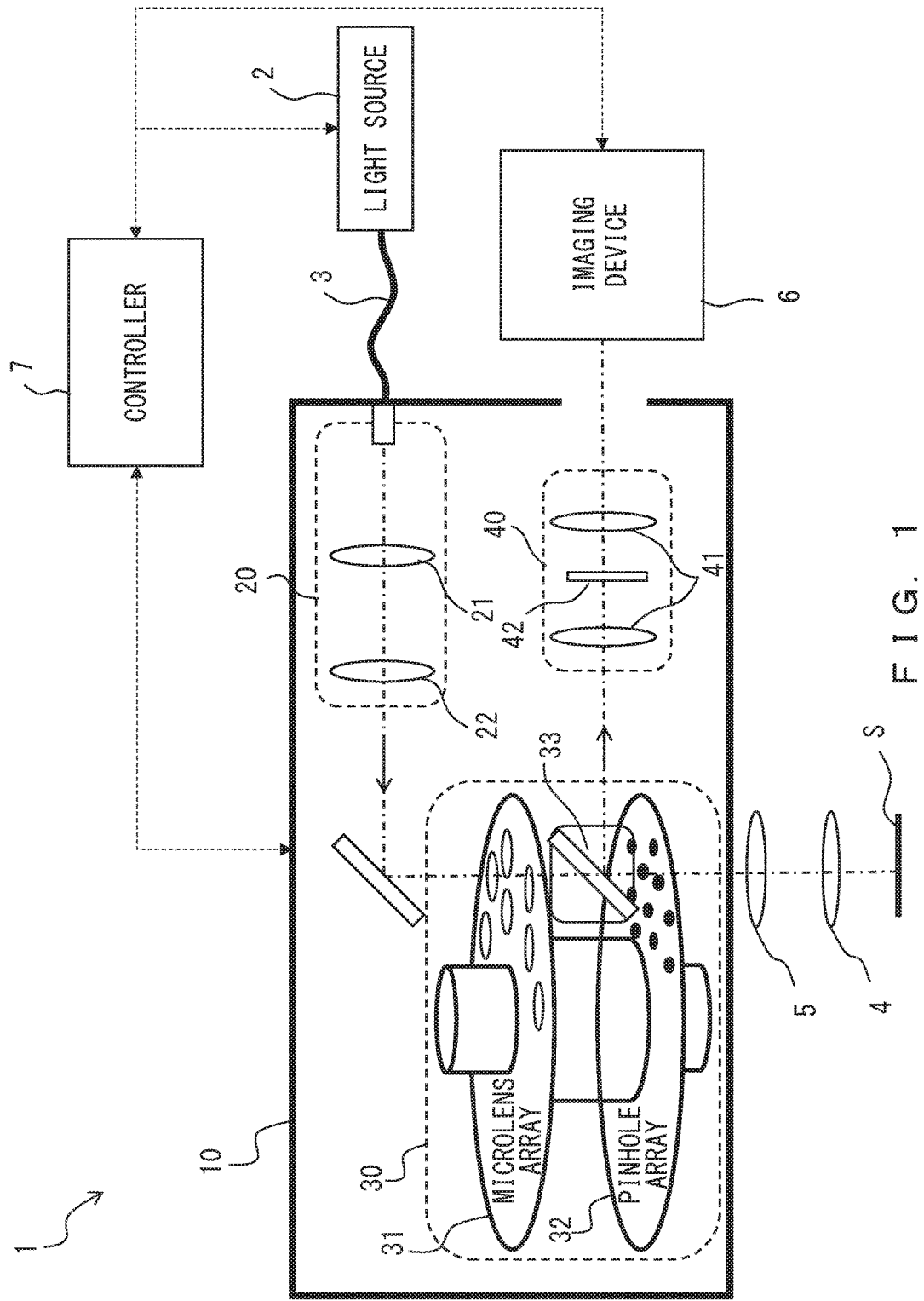
FIG. 1 illustrates the configuration of a confocal microscope 1.

FIG. 1 illustrates the configuration of a confocal microscope 1. The basic configuration of a confocal microscope in each of the examples described below is described with reference to FIG. 1.

The confocal microscope 1 is a spinning-disk confocal microscope that includes a confocal scanner 10. A sample S that is an object to be observed by the confocal microscope 1 is not particularly limited, but the sample S is, for example, a biological sample. The confocal microscope 1 is, for example, a fluorescence microscope that irradiates the sample S with excitation light so as to detect fluorescence generated by the sample S. The confocal microscope 1 includes a light source 2, an optical fiber 3, an objective 4, a tube lens 5, an imaging device 6, and a controller 7 in addition to the confocal scanner 10, as illustrated in FIG. 1.

The light source 2 is a light source that emits excitation light, and examples of the light source 2 include a laser and a white light source. The type of the laser is not particularly limited, but the laser may be, for example, a semiconductor laser or a gas laser. The type of the white light source is not particularly limited, but the white light source may be, for example, a lamp light source such as a mercury lamp or a xenon lamp, or an LED light source. The light source 2 may be a laser unit that simultaneously or selectively emits laser beams having plural wavelengths. The light source 2 is controlled by the controller 7.

The optical fiber 3 is an optical fiber that introduces light from the light source 2 into the confocal scanner 10, and it is preferable that the optical fiber 3 be a multimode optical fiber. The multimode optical fiber has a core diameter that is larger than that of a single-mode optical fiber, and a high coupling efficiency can be achieved.

The objective 4 is an infinity-corrected objective, and the objective 4 is mounted onto a revolver (not illustrated). A plurality of objectives having different specifications from each other can be mounted onto the revolver. In the confocal microscope 1, objectives are appropriately switched and used according to a range to be observed. The tube lens 5 condenses a parallel light flux from the objective 4, and forms an intermediate image of the sample S. The imaging device 6 is a digital camera including a two-dimensional image sensor, and examples of the imaging device 6 include a CCD camera and a CMOS camera.

The controller 7 is a control device that controls the confocal microscope 1. The controller 7 controls, for example, emission of light from the light source 2, an exposure time of the imaging device 6, the rotation of a disk unit 30, and the like.

The confocal scanner 10 is a confocal scanner into which light from the light source 2 is introduced via the optical fiber 3. The confocal scanner 10 forms a multi-focused beam, and scans the sample S with the multi-focused beam. The confocal scanner 10 includes an illumination optical system 20, a disk unit 30 that includes rotary disks (a rotary disk 31 and a rotary disk 32), and a detection optical system 40.

The illumination optical system 20 is an optical system that irradiates the rotary disk 31 with light from an emission end face of the optical fiber 3, and the illumination optical system 20 includes a plurality of lenses (a lens 21 and a lens 22). The illumination optical system 20 includes an element that changes a magnification at which the emission end face of the optical fiber 3 is projected onto the rotary disk 31. Specifically, as an example, the illumination optical system 20 may include at least one lens that moves in a direction of an optical axis of the illumination optical system 20 (hereinafter referred to as a moving lens), or may include a spatial light modulator. At least one moving lens may be manually moved by using a moving mechanism, or may be electrically moved by the moving mechanism under the control of the controller 7. The spatial light modulator is controlled by the controller 7.

The disk unit 30 includes two rotary disks (a rotary disk 31 and a rotary disk 32) and a dichroic mirror 33 that is arranged between the rotary disks. The dichroic mirror 33 has a spectral wavelength characteristic whereby excitation light is transmitted and fluorescence is reflected.

The rotary disk 31 is a first rotary disk of the disk unit 30. The rotary disk 31 is a microlens array disk that has a microlens array that splits light from the emission end face of the optical fiber 3 into plural light beams, and condenses the respective plural light beams. The rotary disk 31 is arranged at a position in which the emission end face of the optical fiber 3 is projected by the illumination optical system 20. The rotary disk 32 is a second rotary disk of the disk unit 30. The rotary disk 32 is a pinhole array disk that has a plurality of pinholes (a pinhole array) that are arranged so as to correspond to a lens array of the microlens array. The rotary disk 32 is arranged at a position of an intermediate image of the sample S that is formed by the objective 4 and the tube lens 5. The microlens array 31 and the pinhole array 32 are arranged in such a way that the pinholes are located in respective focal positions of microlenses, and the microlens array 31 and the pinhole array 32 integrally rotate such that the position relationship above is maintained.

When pinholes are arranged in a hexagonal packed arrangement in the rotary disk 32 so as to have substantially equal spaces between each other, the rotary disk 31 may be a hexagonal packed disk in which microlenses are arranged in a hexagonal packed arrangement. The rotary disk 32 may be a Nipkow disk in which pinholes are spirally arranged so as to have equal spaces between each other in a circumferential direction. In this case, the rotary disk 31 has a microlens array in which microlenses are spirally arranged. In the rotary disk 32, a plurality of apertures may be formed that are arranged so as to correspond to a lens array of the microlens array, and the formed apertures are not limited to pinholes. In the rotary disk 32, linear slits may be formed. In this case, the rotary disk 31 may have a micro cylindrical lens array. In any case, the apertures of the rotary disk 32 are configured to be located in focal positions of the microlens array of the rotary disk 31.

The detection optical system 40 is an optical system that guides fluorescence reflected by the dichroic mirror 33 to the imaging device 6. The detection optical system 40 includes a relay optical system 41 that relays an image formed by the objective 4 and the tube lens 5 to the imaging device 6, and an absorbing filter 42 used to shield excitation light. The detection optical system 40 may include a filter wheel that includes a plurality of filters having different spectral wavelength characteristics from each other, instead of the absorbing filter 42 or in addition to the absorbing filter 42.

Light emitted from the light source 2 enters the confocal scanner 10 via the optical fiber 3. The illumination optical system 20 irradiates the rotary disk 31 with the light that has entered the confocal scanner 10. The microlens array splits the light that has entered the rotary disk 31 into a multi-focused beam, and the microlens array condenses respective beams of the multi-focused beam to individual pinholes of the pinhole array formed in the rotary disk 32. The tube lens 5 and the objective 4 illuminate a multipoint of the sample S with the multi-focused beam that has passed through the pinholes. In the confocal microscope 1, the position of multipoint illumination changes due to the rotation of the rotary disk 31 and the rotary disk 32 such that a prescribed area in the sample S is illuminated by the multipoint illumination.

An area in the sample S that is illuminated by the multipoint illumination (hereinafter referred to as an illumination area in the sample S) depends on an illumination area in the rotary disk 31 illuminated with excitation light. The illumination area in the sample S substantially corresponds to an area in which the illumination area in the rotary disk 31 is reduced and projected by the objective 4 and the tube lens 5.

The objective 4 and the tube lens 5 irradiate the rotary disk 32 with fluorescence generated from the sample S that has been illuminated with the multi-focused beam, and an intermediate image of the sample S is formed on the rotary disk 32. Only fluorescence that has entered pinhole positions from among fluorescence that has entered the rotary disk 32 passes through the rotary disk 32, and enters the dichroic mirror 33. Therefore, fluorescence generated at a position that is not a focal plane is shielded, and a confocal effect is exhibited. In the confocal microscope 1, the pinhole positions change due to the rotation of the rotary disk 31 and the rotary disk 32, and therefore the entirety of the illumination area in the sample S is projected onto the imaging device 6 via the pinholes by the detection optical system 40 within an exposure time. Consequently, a confocal image of the illumination area can be obtained.

In the confocal microscope 1 having the configuration above, a magnification at which the confocal scanner 10 projects the emission end face of the optical fiber 3 onto the rotary disk 31 can be changed. Therefore, the size of the illumination area in the sample S can be changed. Accordingly, as an example, when the size of a field of view changes due to a change in a total magnification, the size of the illumination area can be changed according to the size of the field of view. In addition, when an excitation wavelength changes, an emission NA of the optical fiber 3 also changes, and therefore the size of the illumination area also changes. In the confocal microscope 1, a change in the size of the illumination area due to a change in the excitation wavelength can be compensated for.

By employing the confocal microscope 1, deterioration in illumination efficiency due to an excessively large illumination area with respect to a field of view and deterioration in uniformity of illumination due to protrusion of the field of view from the illumination area can be prevented, and a high illumination uniformity can be achieved with a high illumination efficiency.

Respective examples are described below in detail.

EXAMPLE 1

Figure 2:
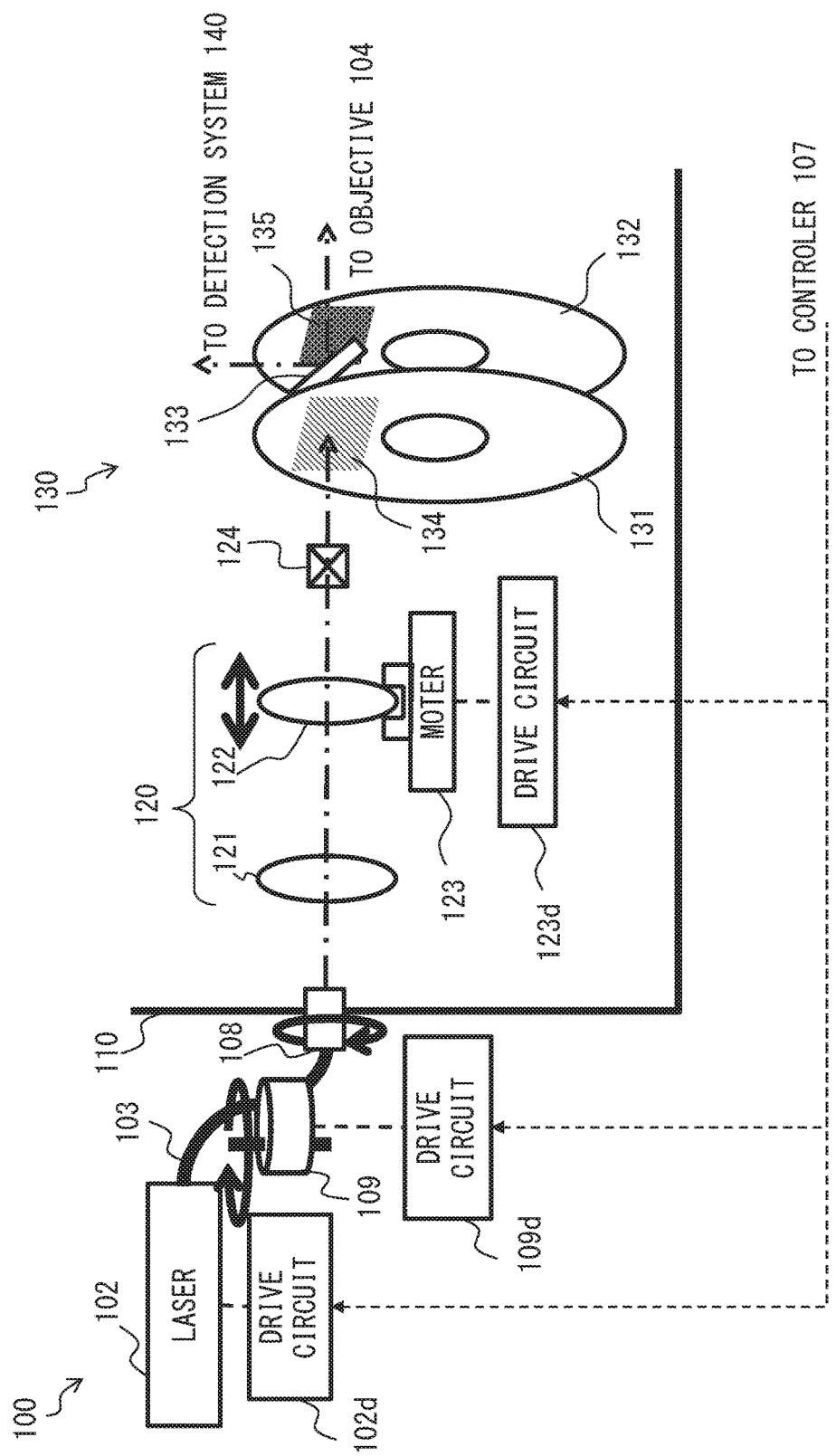
FIG. 2 illustrates the configuration of a confocal microscope 100 in Example 1 of the present invention.

FIG. 2 illustrates the configuration of a confocal microscope 100 in this example. The confocal microscope 100 is a spinning-disk confocal microscope. The confocal microscope 100 includes a laser 102, an optical fiber 103, a controller 107 (not illustrated), a connection mechanism 108, an optical fiber scrambler 109, and a confocal scanner 110.

The laser 102 emits a laser beam that is coherent light. The laser 102 may be a laser unit that simultaneously or selectively emits laser beams having plural wavelengths. Emission of light of the laser 102 is controlled by the controller 107 via a drive circuit 102d.

The optical fiber 103 is a multimode optical fiber. The optical fiber 103 is connected to the confocal scanner 110 by the connection mechanism 108. The connection mechanism 108 is a mechanism that rotatably connects the optical fiber 103 to the confocal scanner 110. By rotating the connection mechanism 108, the orientation of a core on the emission end face of the optical fiber 103 can be changed. The connection mechanism 108 may be included in the confocal scanner 110.

The optical fiber scrambler 109 is a speckle reducer, and is a device that periodically vibrates the optical fiber 103. The operation of the optical fiber scrambler 109 is controlled by the controller 107 via a drive circuit 109d. A laser beam that has been introduced into the confocal scanner 110 via the optical fiber 103 includes laser beams in plural different modes from each other. Accordingly, the laser beams in the plural different modes from each other interfere with each other, and a speckle pattern may be generated within the illumination area. However, by vibrating the optical fiber 103 by using the optical fiber scrambler 109, speckles can be reduced.

It is preferable that the optical fiber scrambler 109 periodically operate at a frequency that is greater than or equal to a frame rate at which the confocal microscope 100 obtains a confocal image. By operating at a frequency that is greater than or equal to the frame rate, a plurality of speckle patterns are formed on the sample S within one frame period. Consequently, the speckle patterns are averaged and become inconspicuous, and therefore an effect of the speckles on the confocal image is suppressed.

It is further preferable that an operation frequency F(Hz) of the optical fiber scrambler 109 satisfy the following relationship. In the following relationship, N is the number of pinholes that are projected within a field of view, P is the number of pixels of an imaging device, and R is a frame rate (fps) at which the confocal microscope 100 obtains a confocal image.

Operation frequency $F \geq$ number of pixels $P \times$ frame rate $R$/number of pinholes $N$ As an example, when the number of pinholes projected onto a field of view is 1000, the number of pixels of an imaging device is 512×512 pixels, and a frame rate is 30 fps, it is preferable that an operation frequency be greater than or equal to 7.86 kHz (=512×512×30/1000). This allows speckle patterns to be switched in a time period that is shorter than a time period during which respective pixels are continuously illuminated. Accordingly, an effect of speckles included in signals from the respective pixels can be further reduced.

The confocal scanner 110 is a confocal scanner into which a laser beam is introduced via the optical fiber 3. The confocal scanner 110 includes an illumination optical system 120, a moving mechanism 123, an axis adjusting mechanism 124, a disk unit 130, and a detection optical system 140.

The illumination optical system 120 is an optical system that irradiates a microlens array disk 131 with light from the emission end face of the optical fiber 103, and the illumination optical system 120 includes a lens 121 and a lens 122. The lens 122 is a moving lens that moves in a direction of an optical axis of the illumination optical system 120. The moving mechanism 123 is a mechanism that moves the lens 122 in the optical axis direction by using the rotation of a motor. The movement of the moving lens by using the moving mechanism 123 is controlled by the controller 107 via a drive circuit 123d. The controller 107 may control the movement of the moving lens, for example, in accordance with at least either a total magnification or an illumination wavelength (an excitation wavelength) of the confocal microscope 100. The controller 107 may control the movement of the moving lens, for example, in such a way that the entirety of a field of view of the confocal microscope 100 is illuminated.

The disk unit 130 includes a microlens array disk 131, a pinhole array disk 132, and a dichroic mirror 133. The dichroic mirror 133 is arranged between the microlens array disk 131 and the pinhole array disk 132.

The axis adjusting mechanism 124 is a mechanism that adjusts a relationship between the optical axis of the illumination optical system 120 and an optical axis of an objective 104, and the axis adjusting mechanism 124 is configured, for example, of one or more mirrors. By adjusting the angles of the one or more mirrors, the confocal microscope 100 can be adjusted in such a way that light with which the microlens array disk 131 has been irradiated passes through the pinhole array disk 132, and enters the objective 104.

Figure 3:
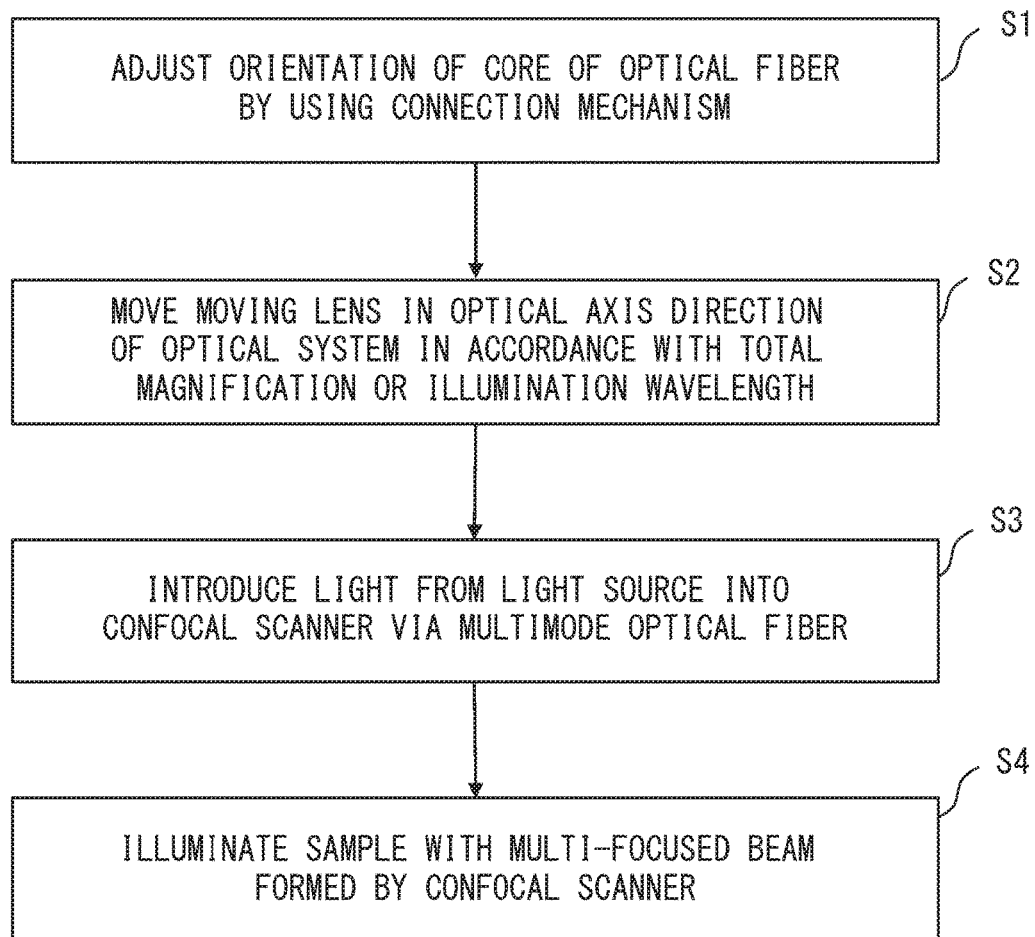
FIG. 3 is a flowchart illustrating the procedure of an illumination method performed by the confocal microscope 100.

FIG. 3 is a flowchart illustrating the procedure of an illumination method performed by the confocal microscope 100. A method in which the confocal microscope 100 illuminates the sample S is described below with reference to FIG. 3.

First, a user of the confocal microscope 100 adjusts the orientation of a core of the optical fiber 103 by using the connection mechanism 108 (step S1). Details of this adjustment will be described later. The process of step S1 has only to be performed as needed, and the process of step S1 may be omitted.

Then, the controller 107 of the confocal microscope 100 moves the moving lens in a direction of the optical axis of the illumination optical system 120 in accordance with at least either a total magnification or an illumination wavelength in such a way that an area that corresponds to a field of view is illuminated (step S2). Here, the controller 107 controls the movement of the moving lens in such a way that the field of view does not protrude from the illumination area in the sample S and that the illumination area in the sample S does not become excessively large with respect to the field of view.

Figure 4:
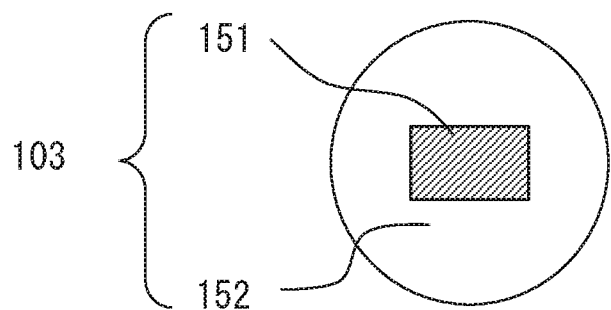
FIG. 4 illustrates an example of an emission end face of an optical fiber 103.
Figure 5:
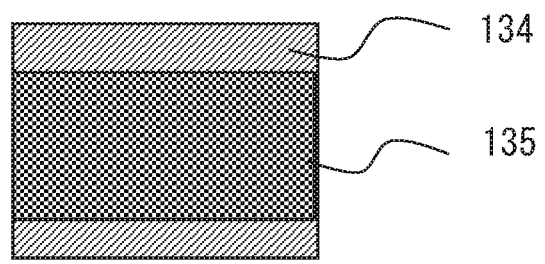
FIG. 5 illustrates an example of a relationship between an illumination area 134 and an intermediate image area 135.

A case in which the optical fiber 103 includes a rectangular core 151 covered with a clad 152, as illustrated in FIG. 4, is described in detail. In this case, it is preferable that the controller 107 control the movement of the moving lens in such a way that the length of a long side of an illumination area 134 on the microlens array disk 131 is almost equal to the length of a long side of an intermediate image area 135 on the pinhole array disk 132, as illustrated in FIG. 5. The illumination area 134 is an area on the microlens array disk 131 in which the emission end face of the optical fiber 103 has been projected, and is an area that corresponds to the illumination area in the sample S. The intermediate image area 135 is an area in which a light receiving plane of an imaging device is projected onto the pinhole array disk 132. The intermediate image area 135 is an area that corresponds to the field of view of the confocal microscope 100. Consequently, the entirety of the field of view can be illuminated while reducing an amount of light incident on the outside of the field of view.

In a case in which the long side of the illumination area 134 is not parallel to the long side of the intermediate image area 135, an illumination efficiency is likely to deteriorate, compared with a case in which the long side of the illumination area 134 is parallel to the long side of the intermediate image area 135. Accordingly, in step S1, the orientation of the core 151 is adjusted in advance by using the connection mechanism 108 in such a way that the long side of the illumination area 134 becomes parallel to the long side of the intermediate image area 135.

Figure 6:
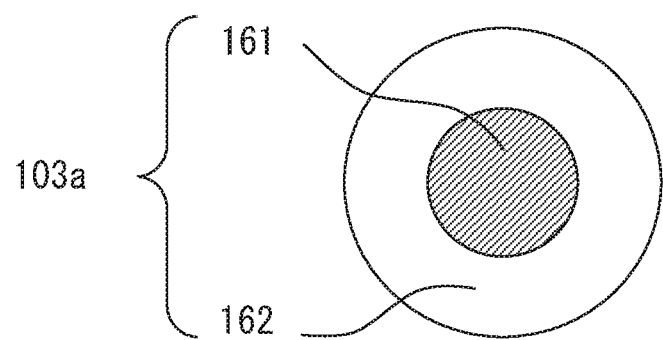
Figure 7:
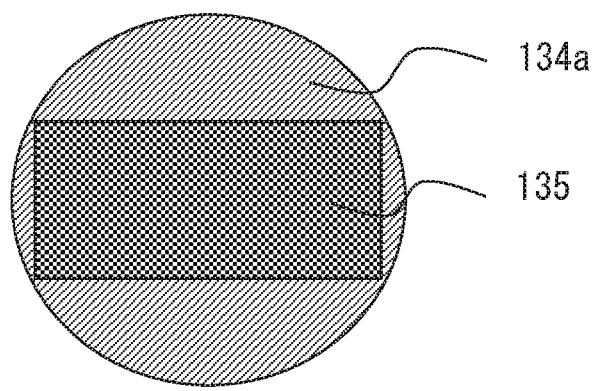
FIG. 7 illustrates another example of a relationship between an illumination area 134a and an intermediate area 135.

The confocal microscope 100 may include an optical fiber 103a that includes a circular core 161 covered with a clad 162, as illustrated in FIG. 6, instead of the optical fiber 103. In this case, in step S2, it is preferable that the controller 107 control the movement of the moving lens in such a way that the diameter of an illumination area 134a is almost equal to a diagonal length of the intermediate image area 135, as illustrated in FIG. 7.

When the movement of the moving lens is completed, the controller 107 introduces light from the laser 102 into the confocal scanner 110 via the optical fiber 103 (step S3), and illuminates the sample S with a multi-focused beam formed by the confocal scanner 110 (step S4).

The confocal microscope 100 can achieve a high illumination uniformity with a high illumination efficiency by illuminating the sample S using the method illustrated in FIG. 3. By the controller 107 making the optical fiber scrambler 109 operate, deterioration in image quality due to speckles can be suppressed.

Figure 8:
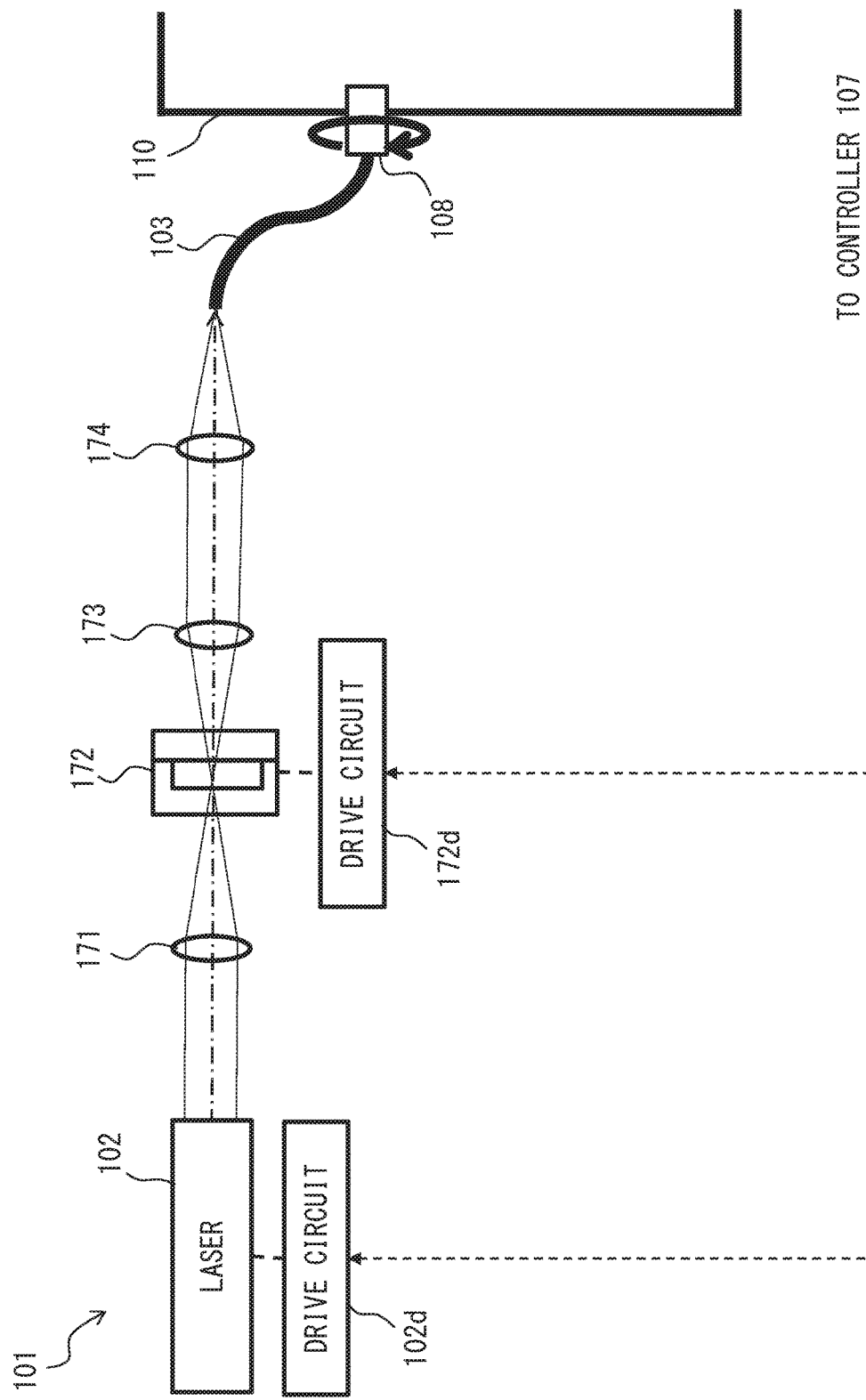
FIG. 8 illustrates the configuration of a confocal microscope 101 in a variation.

FIG. 8 illustrates the configuration of a confocal microscope 101 in a variation. The confocal microscope 101 is different from the confocal microscope 100 in that the confocal microscope 101 includes a lens 171, a speckle reducer 172, a lens 173, and a lens 174 that are arranged on an optical path between the laser 102 and the optical fiber 103, instead of the optical fiber scrambler 109.

The speckle reducer 172 is a spatial light modulator that periodically modulates a wavefront of a micro area within the beam shape of a laser beam. The speckle reducer 172 periodically operates at a frequency that is greater than or equal to a frame rate at which the confocal microscope 101 obtains a confocal image. The operation of the speckle reducer 172 is controlled by the controller 107 via a drive circuit 172d. The speckle reducer 172 periodically changes a modulation pattern under the control of the controller 107. The speckle reducer 172 may periodically modulate a wavefront of at least a portion of the laser beams, and may modulate all of the laser beams.

The confocal microscope 101 can also achieve a high illumination uniformity with a high illumination efficiency by illuminating the sample S using the method illustrated in FIG. 3. By the controller 107 making the speckle reducer 172 operate, deterioration in image quality due to speckles can be similarly suppressed.

The speckle reducer 172 and the optical fiber scrambler 109 may be simultaneously used, and speckles can be further suppressed by simultaneously using the speckle reducer 172 and the optical fiber scrambler 109. The speckle reducer is not limited to an optical fiber scrambler or a spatial light modulator, and may be, for example, a rotation diffusion plate. It is preferable that a speckle reducer that is a rotation diffusion plate be arranged on an optical path between a light source and an optical fiber, similarly to the spatial light modulator.

EXAMPLE 2

Figure 9:
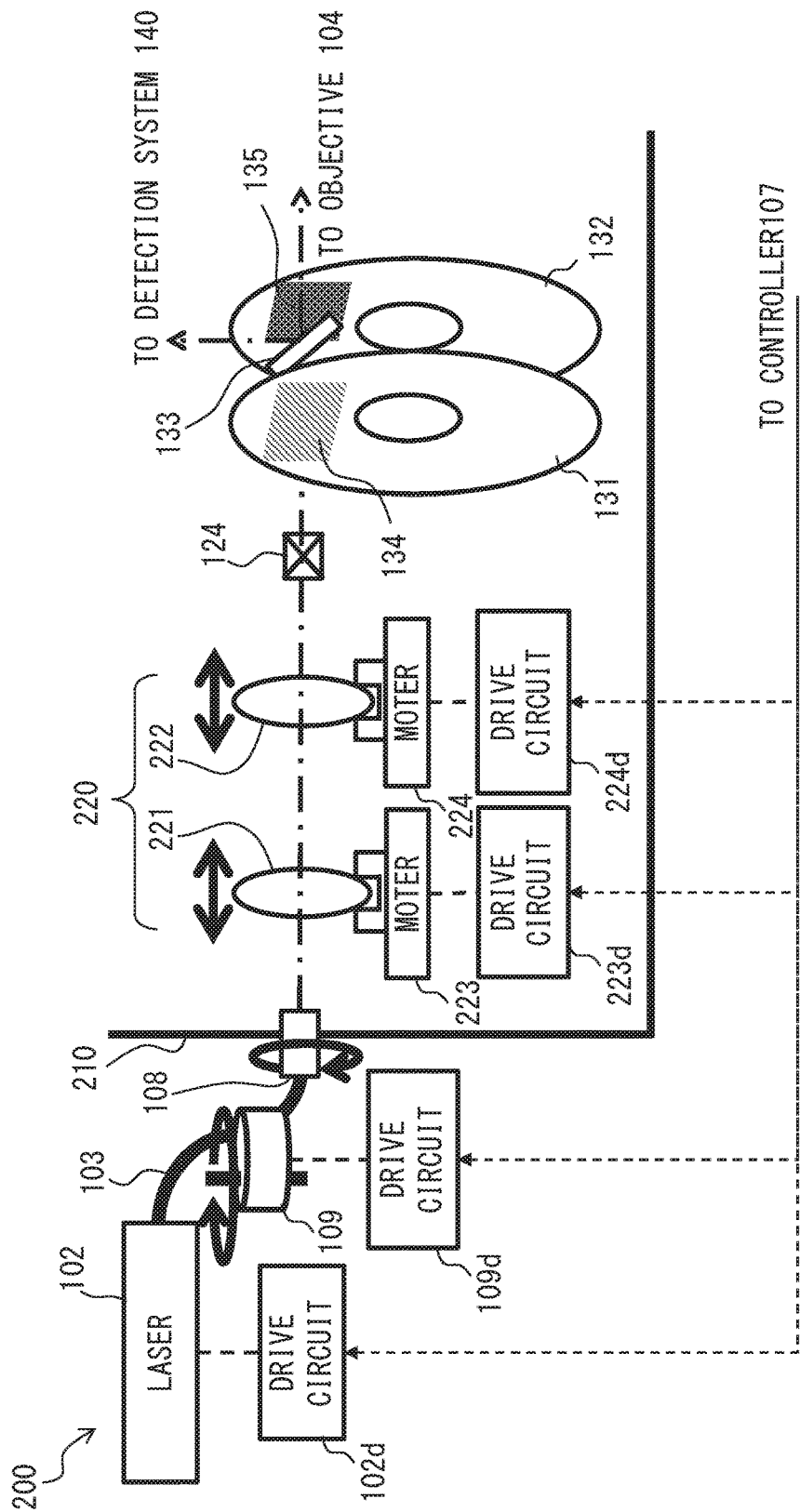
FIG. 9 illustrates the configuration of a confocal microscope 200 in Example 2 of the present invention.

FIG. 9 illustrates the configuration of a confocal microscope 200 in this example. The confocal microscope 200 is different from the confocal microscope 100 in that the confocal microscope 200 includes a confocal scanner 210 instead of the confocal scanner 110. In the other respects, the confocal microscope 200 is similar to the confocal microscope 100.

The confocal scanner 210 includes an illumination optical system 220 instead of the illumination optical system 120. The illumination optical system 220 is an optical system that irradiates the microlens array disk 131 with light from the emission end face of the optical fiber 103, and the illumination optical system 220 includes a lens 221 and a lens 222. Each of the lens 221 and the lens 222 is a moving lens that independently moves in a direction of an optical axis of the illumination optical system 220.

A moving mechanism 223 is a mechanism that moves the lens 221 in an optical axis direction by using the rotation of a motor. The movement of the lens 221 by using the moving mechanism 223 is controlled by the controller 107 via a drive circuit 223d. A moving mechanism 224 is a mechanism that moves the lens 222 in the optical axis direction by using the rotation of a motor. The movement of the lens 222 by using the moving mechanism 224 is controlled by the controller 107 via a drive circuit 224d. The controller 107 controls the movement of the two moving lenses (the lens 221 and the lens 222) in accordance with a total magnification and an illumination wavelength (an excitation wavelength) of the confocal microscope 200.

The confocal microscope 200 can also achieve a high illumination uniformity with a high illumination efficiency by illuminating the sample S using the method illustrated in FIG. 3. In the confocal microscope 200, roles can be shared by using two lenses, for example, in such a way that a moving lens on an upstream side (the lens 221) principally adjusts a projection magnification and a moving lens on a downstream side (the lens 222) principally adjusts the angle of a light flux with which the microlens array disk 131 is irradiated. This allows the size of an illumination area to be changed with a high accuracy. Accordingly, a change in the size of the illumination area due to a change in an excitation wavelength can be accurately compensated for. Similarly to the confocal microscope 100, by the controller 107 making the optical fiber scrambler 109 operate, deterioration in image quality due to speckles can also be suppressed.

EXAMPLE 3

Figure 10:
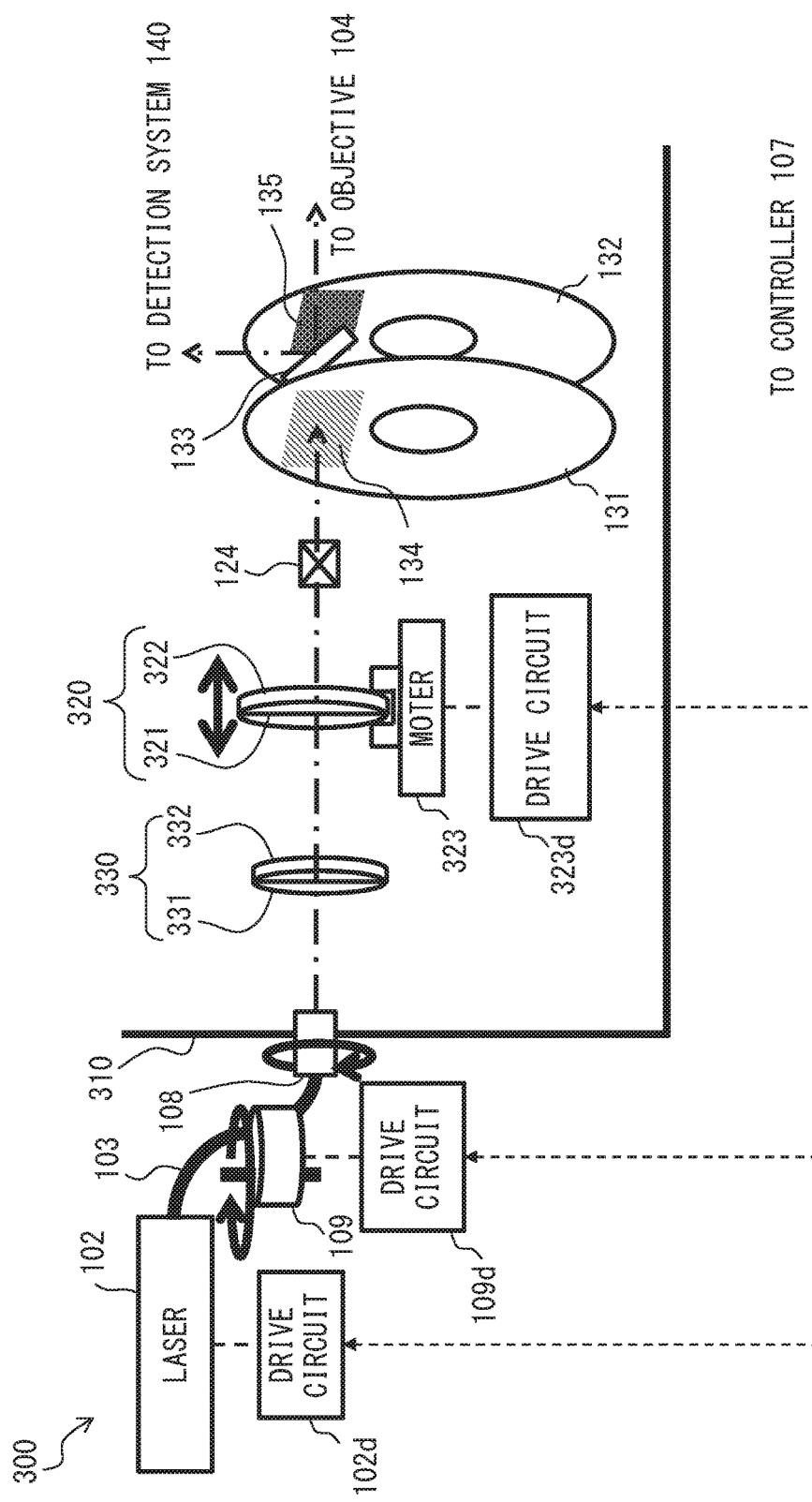
FIG. 10 illustrates the configuration of a confocal microscope 300 in Example 3 of the present invention.

FIG. 10 illustrates the configuration of a confocal microscope 300 in this example. The confocal microscope 300 is different from the confocal microscope 100 in that the confocal microscope 300 includes a confocal scanner 310 instead of the confocal scanner 110. In the other respects, the confocal microscope 300 is similar to the confocal microscope 100.

The confocal scanner 310 includes two achromatic lenses 320 and 330 instead of the illumination optical system 120. The two achromatic lenses 320 and 330 are an optical system that irradiates the microlens array disk 131 with light from the emission end face of the optical fiber 103. The achromatic lens 320 is a cemented lens that is formed of a lens 321 that is a positive lens and a lens 322 that is a negative lens. The achromatic lens 330 is a cemented lens that is formed of the lens 331 that is a positive lens and a lens 332 that is a negative lens. The achromatic lens 320 is also a moving lens that moves in a direction of an optical axis of the achromatic lens 320.

A moving mechanism 323 is a mechanism that moves the achromatic lens 320 in an optical axis direction by using the rotation of a motor. The movement of the achromatic lens 320 by using the moving mechanism 323 is controlled by the controller 107 via a drive circuit 323d. The controller 107 controls the movement of the moving lens, for example, in accordance with a total magnification of the confocal microscope 300.

The confocal microscope 300 can also achieve a high illumination uniformity with a high illumination efficiency by illuminating the sample S using the method illustrated in FIG. 3. In the confocal microscope 300, a chromatic aberration is corrected by using an achromatic lens. Accordingly, even when an excitation wavelength changes, a moving lens does not need to be moved, and therefore the controller 107 can easily control the moving lens. Similarly to the confocal microscope 100, by the controller 107 making the optical fiber scrambler 109 operate, deterioration in image quality due to speckles can also be suppressed.

EXAMPLE 4

Figure 11:
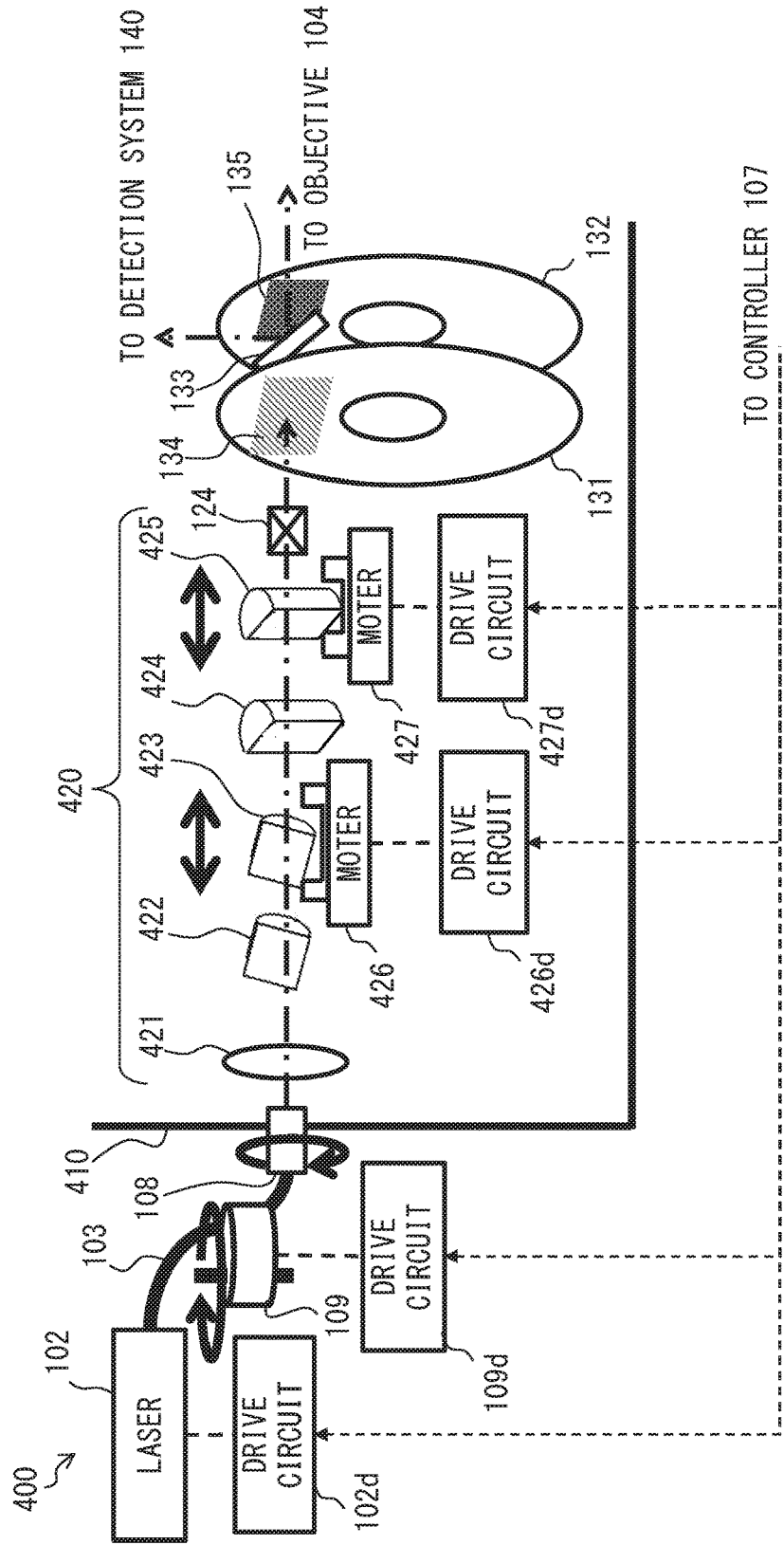
FIG. 11 illustrates the configuration of a confocal microscope 400 in Example 4 of the present invention.

FIG. 11 illustrates the configuration of a confocal microscope 400 in this example. The confocal microscope 400 is different from the confocal microscope 100 in that the confocal microscope 400 includes a confocal scanner 410 instead of the confocal scanner 110. In the other respects, the confocal microscope 400 is similar to the confocal microscope 100.

The confocal scanner 410 includes an illumination optical system 420 instead of the illumination optical system 120. The illumination optical system 420 is an optical system that irradiates the microlens array disk 131 with light from the emission end face of the optical fiber 103. The illumination optical system 420 includes a lens 421, four cylindrical lenses (a cylindrical lens 422, a cylindrical lens 423, a cylindrical lens 424, and a cylindrical lens 425). Each of the cylindrical lens 423 and the cylindrical lens 425 is a moving lens that independently moves in a direction of an optical axis of the illumination optical system 420.

The cylindrical lens 422 and the cylindrical lens 423 are a plurality of first cylindrical lenses that are included in the illumination optical system 420, and the cylindrical lens 422 and the cylindrical lens 423 have refractive power on a first plane including the optical axis of the illumination optical system 420. The cylindrical lens 424 and the cylindrical lens 425 are a plurality of second cylindrical lenses that are included in the illumination optical system 420, and the cylindrical lens 424 and the cylindrical lens 425 have refractive power on a second plane including the optical axis of the illumination optical system 420. The second plane is orthogonal to the first plane. Namely, the cylindrical lens 422 and the cylindrical lens 423 have refractive power on a plane that is different by 90 degrees from the plane of the cylindrical lens 424 and the cylindrical lens 425.

A moving mechanism 426 is a mechanism that moves the cylindrical lens 423 in an optical axis direction by using the rotation of a motor. The movement of the cylindrical lens 423 by using the moving mechanism 426 is controlled by the controller 107 via a drive circuit 426d. A moving mechanism 427 is a mechanism that moves the cylindrical lens 425 in the optical axis direction by using the rotation of a motor. The movement of the cylindrical lens 425 by using the moving mechanism 427 is controlled by the controller 107 via a drive circuit 427d. The controller 107 controls the movement of two moving lenses (the cylindrical lens 423 and the cylindrical lens 425) in accordance with at least either a total magnification or an illumination wavelength (an excitation wavelength) of the confocal microscope 400.

The confocal microscope 400 can also achieve a high illumination uniformity with a high illumination efficiency by illuminating the sample S using the method illustrated in FIG. 3. In the confocal microscope 400, the size of an illumination area in the sample S can be changed individually in an X direction and a Y direction that are orthogonal to an optical axis of the objective 104 by independently moving the cylindrical lens 423 and the cylindrical lens 425. This allows an illumination area having a shape closer to a shape of a field of view to be formed. Accordingly, a high illumination uniformity can be achieved with a higher illumination efficiency than that of the confocal microscope 100. Similarly to the confocal microscope 100, by the controller 107 making the optical fiber scrambler 109 operate, deterioration in image quality due to speckles can also be suppressed.

The lens 421 may be omitted. However, by the illumination optical system 420 including the lens 421, a light flux can be suppressed from diverging in lenses that are arranged closer to an object than the lens 421. Therefore, the diameters of lenses that form the illumination optical system 420 can be reduced. Accordingly, it is preferable that the lens 421 be arranged the closest to a light source.

EXAMPLE 5

Figure 12:
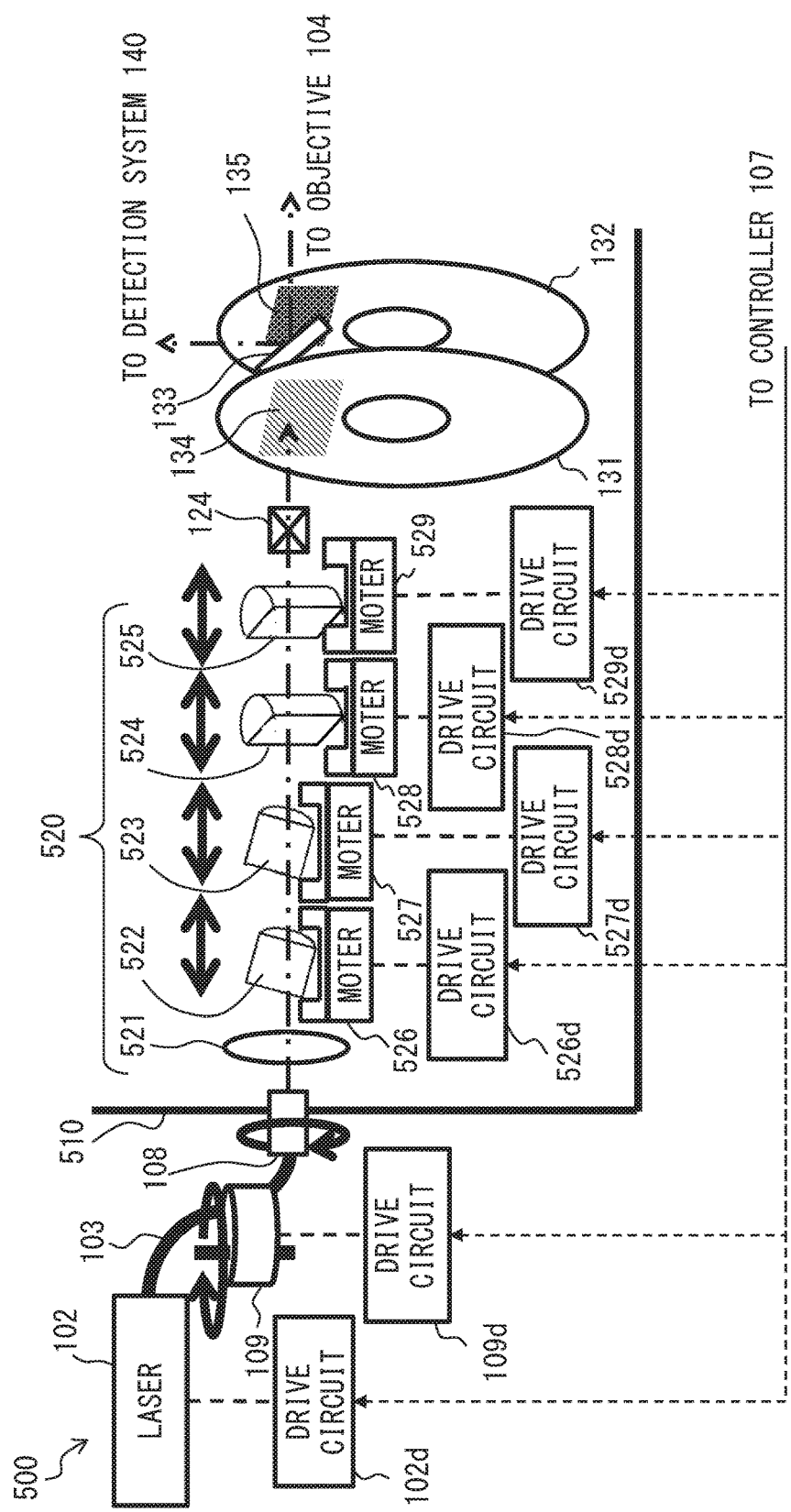
FIG. 12 illustrates the configuration of a confocal microscope 500 in Example 5 of the present invention.

FIG. 12 illustrates the configuration of a confocal microscope 500 in this example. The confocal microscope 500 is different from the confocal microscope 400 in that the confocal microscope 500 includes a confocal scanner 510 instead of the confocal scanner 410. In the other respects, the confocal microscope 500 is similar to the confocal microscope 400.

The confocal scanner 510 includes an illumination optical system 520 instead of the illumination optical system 420. The illumination optical system 520 is an optical system that irradiates the microlens array disk 131 with light from the emission end face of the optical fiber 103. The illumination optical system 520 includes a lens 521 and four cylindrical lenses (a cylindrical lens 522, a cylindrical lens 523, a cylindrical lens 524, and a cylindrical lens 525). All of the four cylindrical lenses are moving lenses that independently move in a direction of an optical axis of the illumination optical system 520.

The cylindrical lens 522 and the cylindrical lens 523 are a plurality of first cylindrical lenses that are included in the illumination optical system 520, and the cylindrical lens 522 and the cylindrical lens 523 have refractive power on a first plane including the optical axis of the illumination optical system 520. The cylindrical lens 524 and the cylindrical lens 525 are a plurality of second cylindrical lenses that are included in the illumination optical system 520, and the cylindrical lens 524 and the cylindrical lens 525 have refractive power on a second plane including the optical axis of the illumination optical system 520. The second plane is orthogonal to the first plane. Namely, the cylindrical lens 522 and the cylindrical lens 523 have refractive power on a plane that is different by 90 degrees from the plane of the cylindrical lens 524 and the cylindrical lens 525.

A moving mechanism 526 is a mechanism that moves the cylindrical lens 522 in the optical axis direction by using the rotation of a motor. The movement of the cylindrical lens 522 by using the moving mechanism 526 is controlled by the controller 107 via a drive circuit 526d. A moving mechanism 527 is a mechanism that moves the cylindrical lens 523 in the optical axis direction by using the rotation of a motor. The movement of the cylindrical lens 523 by using the moving mechanism 527 is controlled by the controller 107 via a drive circuit 527d. A moving mechanism 528 is a mechanism that moves the cylindrical lens 524 in the optical axis direction by using the rotation of a motor. The movement of the cylindrical lens 524 by using the moving mechanism 528 is controlled by the controller 107 via a drive circuit 528d. A moving mechanism 529 is a mechanism that moves the cylindrical lens 525 in the optical axis direction by using the rotation of a motor. The movement of the cylindrical lens 525 by using the moving mechanism 529 is controlled by the controller 107 via a drive circuit 529d. The controller 107 controls the movement of four moving lenses in accordance with a total magnification and an illumination wavelength (an excitation wavelength) of the confocal microscope 500.

In the confocal microscope 500, the size of an illumination area in the sample S can be changed individually in an X direction and a Y direction, similarly to the confocal microscope 400. Accordingly, a high illumination uniformity can be achieved with a higher illumination efficiency than that of the confocal microscope 100 by illuminating the sample S using the method illustrated in FIG. 3. In the confocal microscope 500, roles with regard to each of the X direction and the Y direction can be shared by using two lenses, similarly to the confocal microscope 200. This allows the size in the X direction and the size in the Y direction of the illumination area to be changed with a high accuracy. Accordingly, a change in the size of the illumination area due to a change in an excitation wavelength can be compensated for more accurately. Similarly to the confocal microscope 400, by the controller 107 making the optical fiber scrambler 109 operate, deterioration in image quality due to speckles can also be suppressed.

EXAMPLE 6

Figure 13:
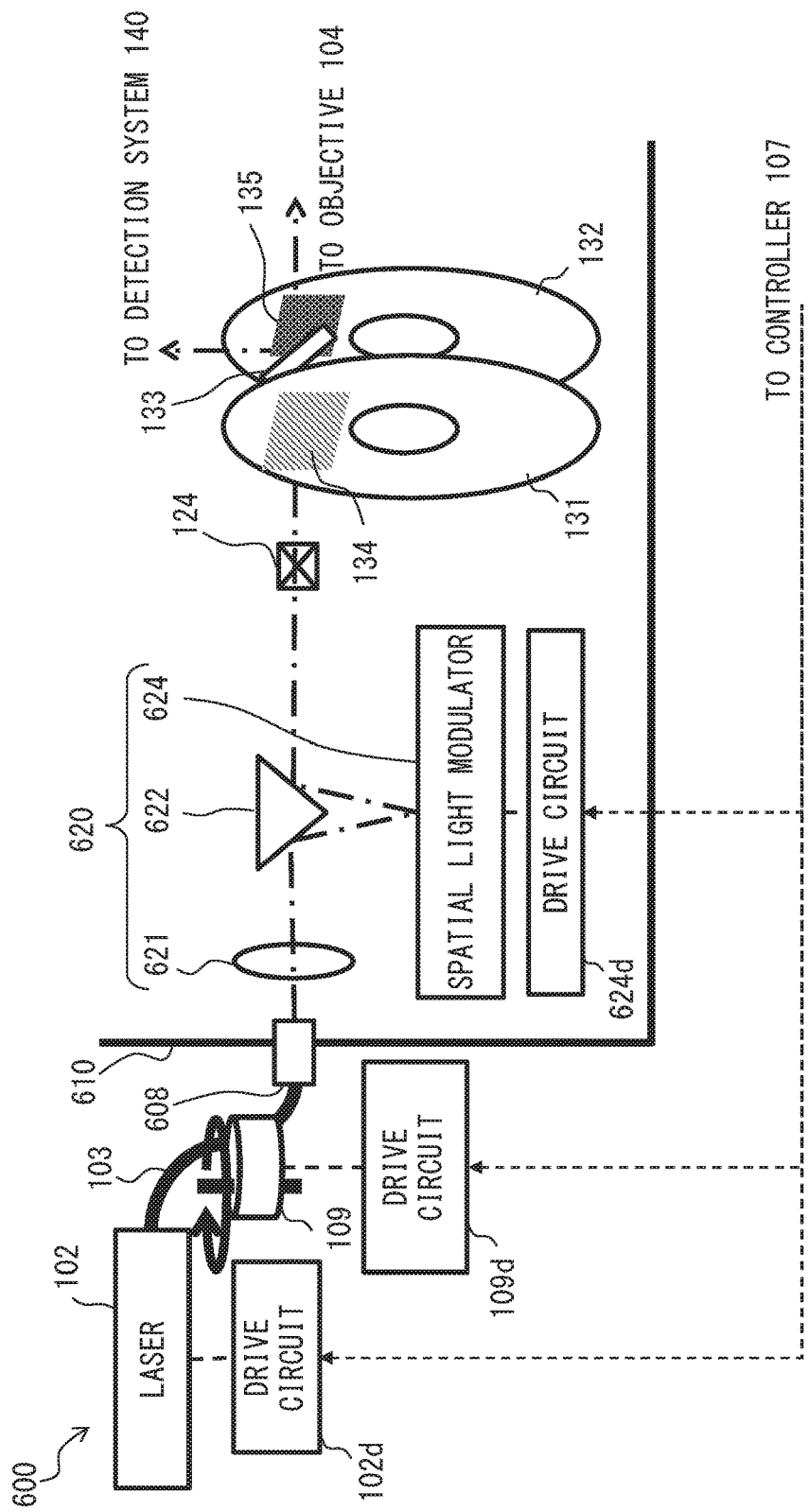
FIG. 13 illustrates the configuration of a confocal microscope 600 in Example 6 of the present invention.

FIG. 13 illustrates the configuration of a confocal microscope 600 in this example. The confocal microscope 600 is different from the confocal microscope 100 in that the confocal microscope 600 includes a confocal scanner 610 instead of the confocal scanner 110 and that the confocal microscope 600 includes a connection mechanism 608 instead of the rotatable connection mechanism 108. In the other respects, the confocal microscope 600 is similar to the confocal microscope 100. The connection mechanism 608 is different from the connection mechanism 108 in that the connection mechanism 608 does not have a rotation structure.

The confocal scanner 610 includes an illumination optical system 620 instead of the illumination optical system 120. The illumination optical system 620 is an optical system that irradiates the microlens array disk 131 with light from the emission end face of the optical fiber 103. The illumination optical system 620 includes a lens 621, a prism 622, and a spatial light modulator 624.

The spatial light modulator 624 is a reflection-type spatial light modulator (SLM) that is arranged in an optical path between the emission end face of the optical fiber 103 and the microlens array disk 131. The spatial light modulator 624 may be, for example, a liquid crystal on silicon (LCOS) SLM, a deformable mirror, or the like. By changing a modulation pattern of the spatial light modulator 624, the size, shape, orientation, and the like of the illumination area 134 change.

The modulation pattern of the spatial light modulator 624 is controlled by the controller 107 via a drive circuit 624d. The controller 107 controls the spatial light modulator 624 in accordance with at least either a total magnification or an illumination wavelength (an excitation wavelength) of the confocal microscope 600. It is preferable that the controller 107 control the spatial light modulator 624 in such a way that the entirety of a field of view of the confocal microscope 600 is illuminated.

Figure 14:
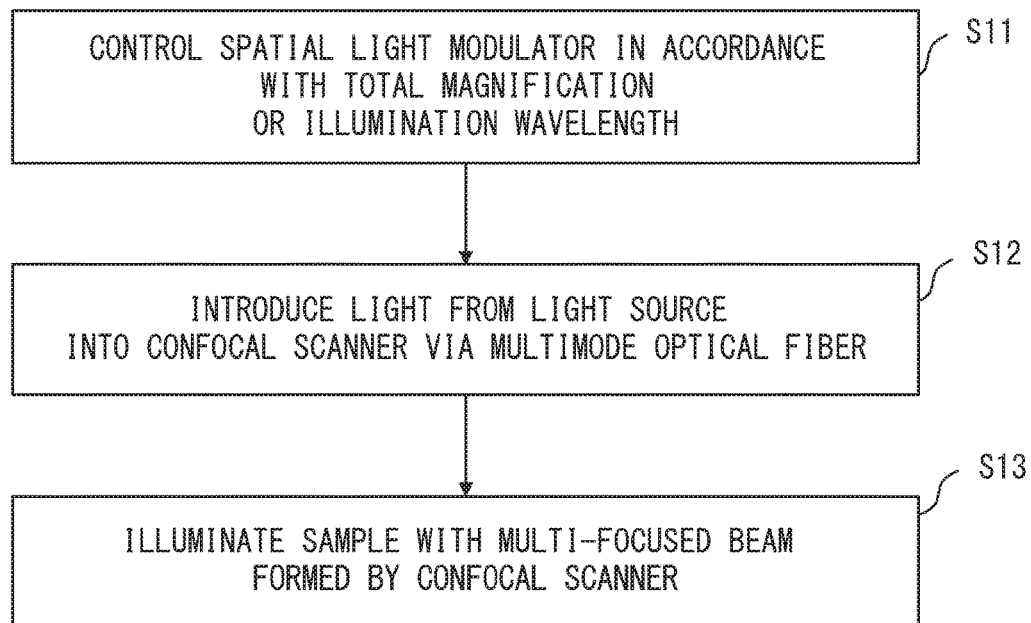
FIG. 14 is a flowchart illustrating the procedure of an illumination method performed by the confocal microscope 600.

FIG. 14 is a flowchart illustrating the procedure of an illumination method performed by the confocal microscope 600. A method in which the confocal microscope 600 illuminates the sample S is described below with reference to FIG. 14.

First, the controller 107 of the confocal microscope 600 controls the spatial light modulator 624 in accordance with at least either a total magnification or an illumination wavelength in such a way that an area according to a field of view is illuminated (step S11). Here, the controller 107 changes the modulation pattern of the spatial light modulator 624 in such a way that the field of view does not protrude from an illumination area in the sample S and that the illumination area in the sample S does not become excessively large with respect to the field of view.

When the control of the spatial light modulator 624 is completed, the controller 107 introduces light from the laser 102 via the optical fiber 103 into the confocal scanner 610 (step S12), and illuminates the sample S with a multi-focused beam formed by the confocal scanner 610 (step S13). Steps S12 and S13 are similar to steps S3 and S4 of FIG. 3.

The confocal microscope 600 illuminates the sample S using the method illustrated in FIG. 14 such that a high illumination uniformity can be achieved with a high illumination efficiency. In the confocal microscope 600, the shape and orientation of an illumination area can be changed by changing the modulation pattern of the spatial light modulator 624. Accordingly, a high illumination efficiency can be achieved without adjusting in advance the orientation of a core of the optical fiber 103, and therefore a mechanical structure that rotates the optical fiber 103 can be omitted, and a device configuration can be simplified. In addition, similarly to the confocal microscope 100, deterioration in image quality due to speckles can also be suppressed by the controller 107 making the optical fiber scrambler 109 operate.

EXAMPLE 7

Figure 15:
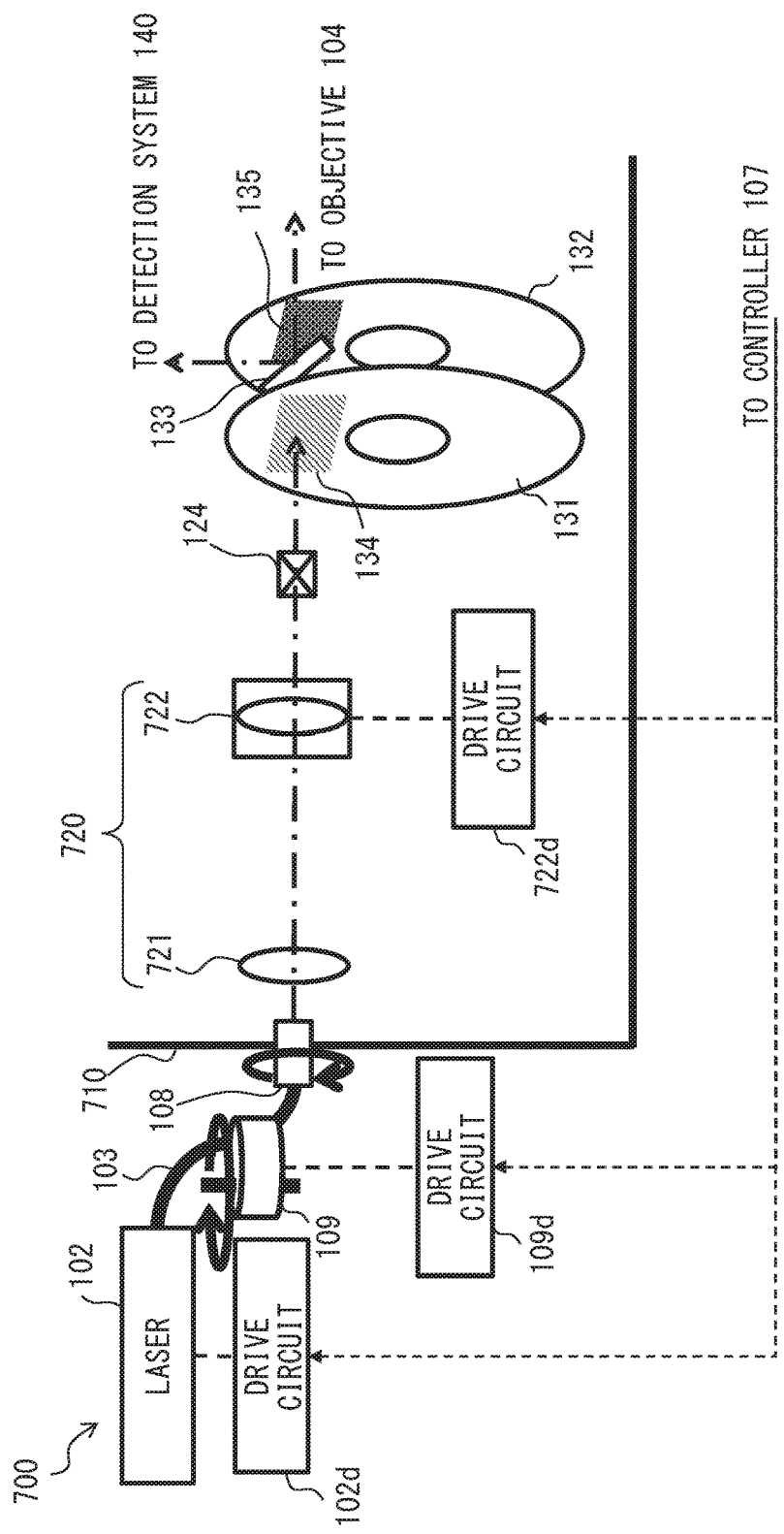
FIG. 15 illustrates the configuration of a confocal microscope 700 in Example 7 of the present invention.

FIG. 15 illustrates the configuration of a confocal microscope 700 in this example. The confocal microscope 700 is different from the confocal microscope 600 in that the confocal microscope 700 includes a confocal scanner 710 instead of the confocal scanner 610 and that the confocal microscope 700 includes the connection mechanism 108 instead of the connection mechanism 608. In the other respects, the confocal microscope 700 is similar to the confocal microscope 600.

The confocal scanner 710 includes an illumination optical system 720 instead of the illumination optical system 620. The illumination optical system 720 is an optical system that irradiates the microlens array disk 131 with light from the emission end face of the optical fiber 103, and the illumination optical system 720 includes a lens 721 and a spatial light modulator 722.

The spatial light modulator 722 is, for example, a vari-focal lens that electrically changes a focal length, an electro-optic (EO) modulator that modulates light by using an electro-optic effect, an acousto-optical (AO) Modulator that modulates light by using an acousto-optical effect, or the like. The spatial light modulator 722 may be an SLM that is formed of a transmission liquid crystal device.

The spatial light modulator 722 is controlled by the controller 107 via a drive circuit 722d. The controller 107 controls the spatial light modulator 722 in accordance with at least either a total magnification or an illumination wavelength (an excitation wavelength) of the confocal microscope 700. It is preferable that the controller 107 control the spatial light modulator 722 in such a way that the entirety of a field of view of the confocal microscope 700 is illuminated.

The confocal microscope 700 can achieve a high illumination uniformity with a high illumination efficiency by illuminating the sample S using the method illustrated in FIG. 14. Similarly to the confocal microscope 600, deterioration in image quality due to speckles can also be suppressed by the controller 107 making the optical fiber scrambler 109 operate.

The respective examples described above give specific examples in order to make the invention easily understandable, and the present invention is not limited to the examples described above. Various modifications or variations can be made to a confocal scanner, a confocal microscope, and an illumination method without departing from the scope of the present invention specified in the claims. A single example may be implemented by combining some features in the context of individual examples described herein. As an example, a configuration in which the optical fiber scrambler 109 is employed has been described in Examples 2 to 7; however, the speckle reducer 172 illustrated in FIG. 8 may be employed instead of the optical fiber scrambler 109.

In the respective examples, an example in which the laser 102 is included has been described, but a light source is not limited to the laser 102. A light source that emits non-coherent light, such as a white light source, may be used. In this case, a speckle reducer can be omitted. A confocal scanner may include a disk unit that does not include a microlens array disk but includes a pinhole array disk. In addition, the application of the confocal scanner is not limited to fluorescence observation. As an example, a confocal scanner may be used in industrial applications for observing a circuit board or the like, by including a polarization beam splitter and a $\frac{1}{4}\lambda$ plate instead of a dichroic mirror and an absorbing filter.

What is claimed is:
1. A confocal microscope comprising:
a light source;
a confocal scanner;
a multimode optical fiber via which light from the light source is introduced into the confocal scanner;
a plurality of objectives that are selectively switchable; and
a controller,
wherein the confocal scanner includes:
a disk unit that includes a rotary disk; and
an optical system that irradiates the rotary disk with light from an emission end face of the multimode optical fiber and that projects the emission end face of the multimode optical fiber onto the rotary disk,
wherein the optical system includes at least one moving lens for changing, in an adjustable manner, a projection magnification at which the emission end face is projected onto the rotary disk, the at least one moving lens being movable in a direction of an optical axis of the optical system, and
wherein the controller controls movement of the at least one moving lens in accordance with a change in a total magnification of the confocal microscope.

2. The confocal microscope according to claim 1, wherein the optical system includes an achromatic lens that is formed of a positive lens and a negative lens.

3. The confocal microscope according to claim 1, further comprising:
a wavelength selector which selects a wavelength for illumination,
wherein the controller controls movement of the at least one moving lens in accordance with the total magnification and an illumination wavelength of the confocal microscope.

4. The confocal microscope according to claim 1, wherein the controller controls the movement of the at least one moving lens in such a way that an entirety of a field of view of the confocal microscope is illuminated, by making an adjustment such that a length of a long side of, or a diameter of, an illumination area formed on the rotary disk by the optical system is substantially equal to a length of a long side of, or a diagonal length of, an area of an intermediate image of an observed sample formed on the rotary disk by light that passes through an objective selected from the plurality of objectives.

5. The confocal microscope according to claim 1, wherein:
the optical system includes at least two moving lenses that independently move in the direction of the optical axis, and
the controller controls movement of the at least two moving lenses in accordance with the total magnification and an illumination wavelength of the confocal microscope.

6. The confocal microscope according to claim 1, wherein:
the multimode optical fiber includes a rectangular core,
the optical system includes:
a plurality of first cylindrical lenses that have refractive power on a first plane including the optical axis of the optical system; and
a plurality of second cylindrical lenses that have refractive power on a second plane including the optical axis of the optical system, the second plane being orthogonal to the first plane,
at least one of the plurality of first cylindrical lenses is a first moving lens that moves in the direction of the optical axis,
at least one of the plurality of second cylindrical lenses is a second moving lens that moves in the direction of the optical axis, and
the controller controls movement of the first moving lens and the second moving lens in accordance with at least one of the total magnification and an illumination wavelength of the confocal microscope.

7. The confocal microscope according to claim 6, further comprising:
a connection mechanism that rotatably connects the multimode optical fiber to the confocal scanner,
wherein an orientation of the rectangular core of the multimode optical fiber is adjustable to be parallel to an orientation of an illumination area provided by the optical system.

8. The confocal microscope according to claim 1, wherein:
the light source is a laser, and
the confocal microscope further comprises a speckle reducer that periodically operates at a frequency that is greater than or equal to a frame rate at which the confocal microscope obtains an image.

9. The confocal microscope according to claim 8, wherein the speckle reducer is a device that periodically vibrates the multimode optical fiber.

10. The confocal microscope according to claim 8, wherein the speckle reducer is a device that periodically modulates a wavefront of at least a portion of the laser beam from the laser, the speckle reducer being arranged on an optical path between the light source and the multimode optical fiber.

11. A confocal microscope comprising:
a light source;
a confocal scanner;
a multimode optical fiber via which light from the light source is introduced into the confocal scanner;
a plurality of objectives that are selectively switchable; and
a controller,
wherein the confocal scanner includes:
a disk unit that includes a rotary disk; and
an optical system that irradiates the rotary disk with light from an emission end face of the multimode optical fiber and that projects the emission end face of the multimode optical fiber onto the rotary disk,
wherein the optical system includes a spatial light modulator that is arranged in an optical path between the emission end face of the multimode optical fiber and the rotary disk,
wherein the spatial light modulator changes, in an adjustable manner, a projection magnification at which the emission end face is projected onto the rotary disk, and
wherein the controller controls the spatial light modulator in accordance with a change in a total magnification of the confocal microscope.

12. The confocal microscope according to claim 11, wherein the controller controls the spatial light modulator in accordance with the total magnification and an illumination wavelength of the confocal microscope.

13. The confocal microscope according to claim 12, wherein the controller controls the spatial light modulator in such a way that an entirety of a field of view of the confocal microscope is illuminated, by making an adjustment such that a length of a long side of, or a diameter of, an illumination area formed on the rotary disk by the optical system is substantially equal to a length of a long side of, or a diagonal length of, an area of an intermediate image of an observed sample formed on the rotary disk by light that passes through an objective selected from the plurality of objectives.

14. A confocal microscope comprising:
a light source;
a confocal scanner;
a multimode optical fiber via which light from the light source is introduced into the confocal scanner;
a plurality of objectives that are selectively switchable; and
a controller,
wherein the confocal scanner includes:
a disk unit that includes a rotary disk; and
an optical system that irradiates the rotary disk with light from an emission end face of the multimode optical fiber and that projects the emission end face of the multimode optical fiber onto the rotary disk,
wherein the optical system includes an element that is controlled by the controller to change a magnification at which the emission end face of the multimode optical fiber is projected onto the rotary disk.

\* \* \* \* \*